(12) United States Patent
Yoshimura et al.

(10) Patent No.: US 9,625,970 B2
(45) Date of Patent: Apr. 18, 2017

(54) INFORMATION PROCESSING APPARATUS, OPERATION STATE CONTROL METHOD, AND COMPUTER PROGRAM PRODUCT

(71) Applicant: KABUSHIKI KAISHA TOSHIBA, Minato-ku, Tokyo (JP)

(72) Inventors: Shiyo Yoshimura, Kanagawa (JP); Junichi Segawa, Kanagawa (JP); Tatsunori Kanai, Kanagawa (JP); Tetsuro Kimura, Tokyo (JP); Yusuke Shirota, Kanagawa (JP); Masaya Tarui, Kanagawa (JP); Hiroyoshi Haruki, Kanagawa (JP); Satoshi Shirai, Kanagawa (JP); Koichi Fujisaki, Kanagawa (JP); Akihiro Shibata, Tokyo (JP); Haruhiko Toyama, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 345 days.

(21) Appl. No.: 14/143,578

(22) Filed: Dec. 30, 2013

(65) Prior Publication Data
US 2014/0245047 A1  Aug. 28, 2014

(30) Foreign Application Priority Data
Feb. 28, 2013  (JP) .................. 2013-040173

(51) Int. Cl.
G06F 1/32 (2006.01)

(52) U.S. Cl.
CPC .......... *G06F 1/3212* (2013.01); *G06F 1/3206* (2013.01); *Y02B 60/1292* (2013.01)

(58) Field of Classification Search
CPC ............................. G06F 1/3212; G06F 1/3206
See application file for complete search history.

(56) References Cited

U.S. PATENT DOCUMENTS 8,358,298 B2 * 1/2013 Lee ..................... G06F 1/3203
345/211
8,385,986 B2 * 2/2013 Kim ................. H04M 1/72522
320/101

(Continued)

FOREIGN PATENT DOCUMENTS

JP 07-168726 7/1995
JP 2004-334475 11/2004

(Continued)

OTHER PUBLICATIONS

Taiwanese Office Action for Taiwanese Patent Application No. 102147004 mailed on Jun. 29, 2015.

(Continued)

*Primary Examiner* — Stefan Stoynov
(74) *Attorney, Agent, or Firm* — Amin, Turocy & Watson LLP

(57) ABSTRACT

According to an embodiment, an information processing apparatus that includes a processor, has a first control unit, a power storage unit, and a second control unit. The first control unit is configured to control execution of a process by the processor. The power storage unit is configured to store therein power. The second control unit is configured to control reduction of power consumption of the information processing apparatus in a case where there is a process waiting to be executed and an amount of stored power of the power storage unit is equal to or less than a first threshold.

13 Claims, 12 Drawing Sheets

(56) References Cited

U.S. PATENT DOCUMENTS

| | | |
|---|---|---|
| 2003/0061526 A1* | 3/2003 | Hashimoto ........... G06F 1/3228 713/320 |
| 2010/0250984 A1 | 9/2010 | Lee et al. |
| 2010/0257529 A1 | 10/2010 | Wilkerson et al. |
| 2011/0058206 A1 | 3/2011 | Park et al. |
| 2012/0210150 A1 | 8/2012 | de Lind van Wijngaarden et al. |
| 2012/0246356 A1 | 9/2012 | Shibata et al. |
| 2012/0246390 A1 | 9/2012 | Kanai et al. |
| 2012/0246501 A1 | 9/2012 | Haruki et al. |
| 2012/0246503 A1 | 9/2012 | Fujisaki et al. |
| 2013/0073812 A1 | 3/2013 | Kanai et al. |
| 2013/0080812 A1 | 3/2013 | Shirota et al. |
| 2013/0080813 A1 | 3/2013 | Tarui et al. |
| 2013/0091372 A1 | 4/2013 | Kimura et al. |
| 2013/0151882 A1 | 6/2013 | Yamauchi et al. |
| 2013/0191670 A1 | 7/2013 | Haruki et al. |
| 2013/0219203 A1 | 8/2013 | Fujisaki et al. |
| 2013/0254773 A1 | 9/2013 | Kimura et al. |
| 2013/0268781 A1 | 10/2013 | Kanai et al. |
| 2014/0013138 A1 | 1/2014 | Kanai et al. |
| 2014/0013140 A1 | 1/2014 | Segawa et al. |
| 2014/0075227 A1 | 3/2014 | Shirota et al. |
| 2014/0077604 A1 | 3/2014 | Shibata et al. |
| 2014/0089715 A1 | 3/2014 | Kimura et al. |
| 2014/0139500 A1 | 5/2014 | Kimura et al. |
| 2014/0240333 A1 | 8/2014 | Shirota et al. |
| 2014/0245039 A1 | 8/2014 | Segawa et al. |
| 2014/0245045 A1 | 8/2014 | Haruki et al. |

FOREIGN PATENT DOCUMENTS

| | | |
|---|---|---|
| JP | 2005-115620 | 4/2005 |
| JP | 2005-237095 | 9/2005 |
| JP | 2007-160679 | 6/2007 |
| JP | 2008-262370 | 10/2008 |
| JP | 2010-224853 | 10/2010 |
| JP | 2010-259320 | 11/2010 |
| TW | I259946 | 8/2006 |
| TW | 201035741 | 10/2010 |
| WO | 2012/017545 | 2/2012 |

OTHER PUBLICATIONS

Japanese Office Action for Japanese Patent Application No. 2013-040173 mailed on Aug. 30, 2016. Obtained from the USPTO Global Dossier on Oct. 18, 2016. Dictionary last updated on Jul. 24, 2016.

Chinese Office Action for Chinese Patent Application No. 201410016627.6 mailed on Feb. 2, 2016.

* cited by examiner

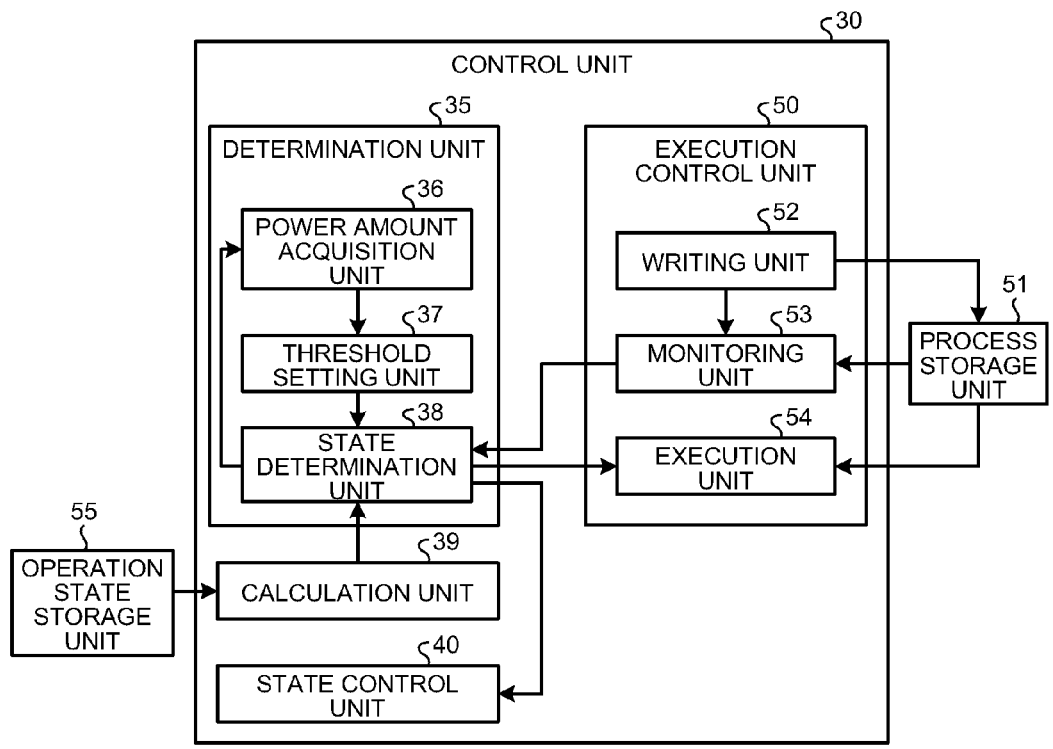

INFORMATION PROCESSING APPARATUS, OPERATION STATE CONTROL METHOD, AND COMPUTER PROGRAM PRODUCT

CROSS-REFERENCE TO RELATED APPLICATION(S)

This application is based upon and claims the benefit of priority from Japanese Patent Application No. 2013-040173, filed on Feb. 28, 2013; the entire contents of which are incorporated herein by reference.

FIELD

Embodiments described herein relate generally to an information processing apparatus, an operation state control method, and a computer program product.

BACKGROUND

These days, with respect to information processing apparatuses, technology for controlling power consumption is important. If control that takes power saving into account is performed by an information processing apparatus, power consumption of the entire appliance can be suppressed, and for example, the operation time can be extended, or sufficient time for charging can be created.

BRIEF DESCRIPTION OF THE DRAWINGS

FIG. 9 is a diagram illustrating an example of a configuration of functional blocks of a control unit of a second embodiment;

FIG. 10 is a diagram illustrating a method of deciding a threshold of an active rate of the second embodiment;

DETAILED DESCRIPTION

According to an embodiment, an information processing apparatus that includes a processor, has a first control unit, a power storage unit, and a second control unit. The first control unit is configured to control execution of a process by the processor. The power storage unit is configured to store therein power. The second control unit is configured to control reduction of power consumption of the information processing apparatus in a case where there is a process waiting to be executed and an amount of stored power of the power storage unit is equal to or less than a first threshold.

First Embodiment

Figure 1:
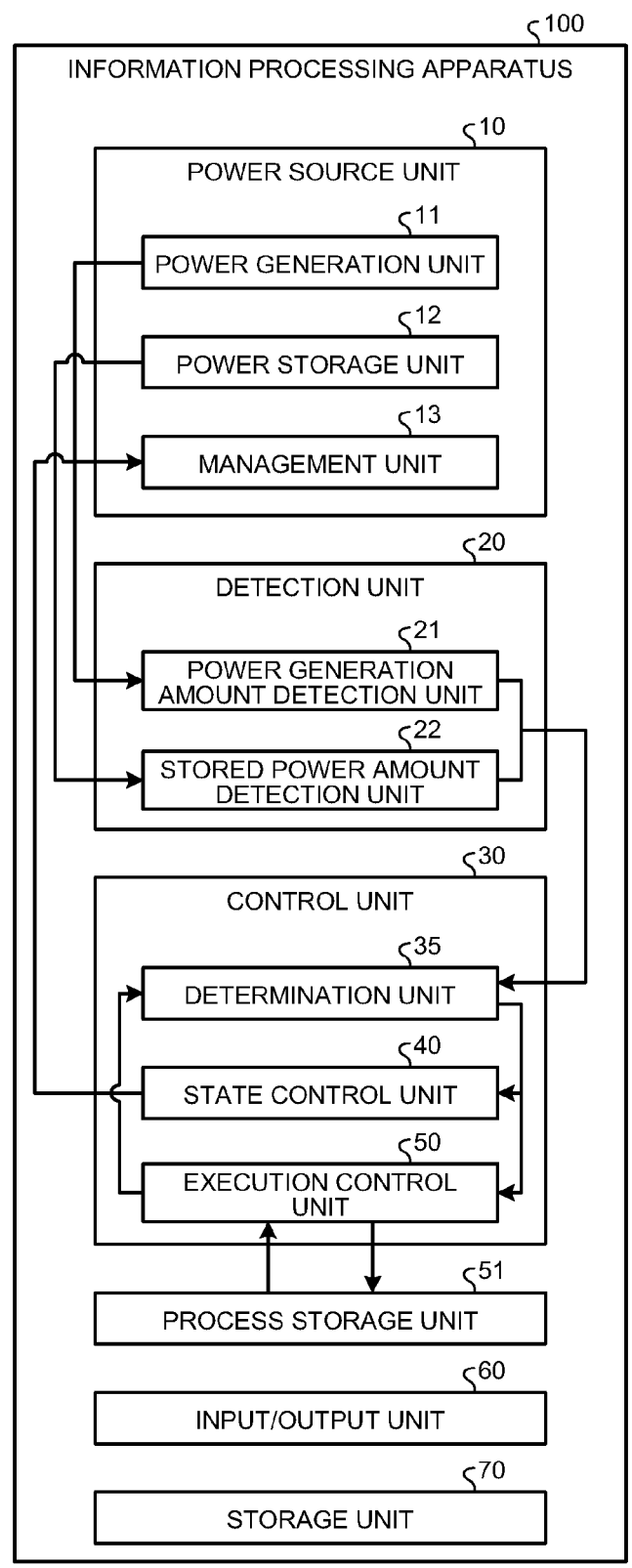
FIG. 1 is a diagram illustrating an example of a configuration of functional blocks of an information processing apparatus of a first embodiment.

FIG. 1 is a diagram illustrating an example of a configuration of functional blocks of an information processing apparatus 100 of a first embodiment. The information processing apparatus 100 of the present embodiment includes a power source unit 10, a detection unit 20, a control unit 30, a process storage unit 51, an input/output unit 60, and a storage unit 70. The power source unit 10 includes a power generation unit 11, a power storage unit 12, and a management unit 13. The detection unit 20 includes a power generation amount detection unit 21, and a stored power amount detection unit 22. The control unit 30 includes a determination unit 35, a state control unit 40, and an execution control unit 50. The function of a "first control unit" of an "information processing apparatus" according to the present invention is served by the execution control unit 50, and the function of a "second control unit" is served by the determination unit 35 and the state control unit 40.

The power generation unit 11 generates power. The power storage unit 12 stores therein power. The management unit 13 supplies power to each device (including devices not illustrated) in the information processing apparatus after adjusting the power to a voltage required by a device which is a supply destination. The power generation amount detection unit 21 measures the amount of power generation of the power generation unit 11. The stored power amount detection unit 22 measures the amount of stored power of the power storage unit 12. In the case where there is a process waiting to be executed, the determination unit 35 determines whether the information processing apparatus 100 is to be placed in a second state which is one of the operation states of the information processing apparatus 100.

A first state is a state where the information processing apparatus 100 is active. Here, a state where the information processing apparatus 100 is active is a state where a process is being executed.

The second state (an idle state) is a state where the power consumption of the information processing apparatus 100 is lower than in the first state. For example, the idle state here is a state where a process is not being executed. In the description of the present embodiment below, the first state will be referred to as an active state, and the second state will be referred to as an idle state.

The determination unit 35 acquires the amount of power generation measured by the power generation amount detection unit 21. Further, the determination unit 35 acquires the amount of stored power measured by the stored power amount detection unit 22. The determination unit 35 receives information about presence/absence of a process from the execution control unit 50. When the information about presence/absence of a process is received, the determination unit 35 acquires the amount of power generation detected by the power generation amount detection unit 21, or acquires the amount of stored power detected by the stored power amount detection unit 22. The determination unit 35 determines whether a process is to be executed, or the information processing apparatus 100 is to be shifted to the idle state, based on the information about presence/absence of a process and the amount of power (the amount of power generation or the amount of stored power) which has been received. In the case of determining that a process is to be executed, the determination unit 35 transmits an instruction to execute the process to the execution control unit 50 described later. In the case of determining that the information processing apparatus 100 is to be shifted to the idle state, the determination unit 35 transmits an instruction to place the information processing apparatus 100 in the idle state, to the state control unit 40. The operation state of the information processing apparatus 100 and determination of the operation state will be described later in detail.

If the operation state of the information processing apparatus 100 is determined to be shifted to the idle state, the state control unit 40 shifts the operation state of the information processing apparatus 100 to the idle state. When shifting the information processing apparatus 100 to the idle state, the state control unit 40 transmits a command for placing the information processing apparatus 100 in a power saving mode to the management unit 13. The power saving mode will be described later.

The execution control unit 50 controls execution of a process. The execution control unit 50 receives a process from an OS (Operating System). The execution control unit 50 writes the received process to the process storage unit 51 described later. The execution control unit 50 receives an instruction to execute a process from the determination unit 35. When the instruction to execute a process is received, the execution control unit 50 reads the process to be executed from the process storage unit 51, and executes the process to be executed.

The process storage unit 51 is a storage unit for storing therein a process. For example, the process storage unit 51 stores therein information for identifying a process to be executed. Processes to be executed and the order of execution may be stored in association with each other. The process storage unit 51 has one or more storage areas.

The input/output unit 60 receives information from outside the information processing apparatus 100. Further, the input/output unit 60 outputs information to outside the information processing apparatus 100. To output includes writing to a storage medium, but this is not restrictive.

The storage unit 70 stores therein computer programs of an operating system and an application, and user data.

The control unit 30 (the determination unit 35, the state control unit 40, and the execution control unit 50) may be software, or hardware such as an IC (Integrated Circuit). Further, the control unit 30 may be implemented by a combination of software and hardware.

Figure 2:
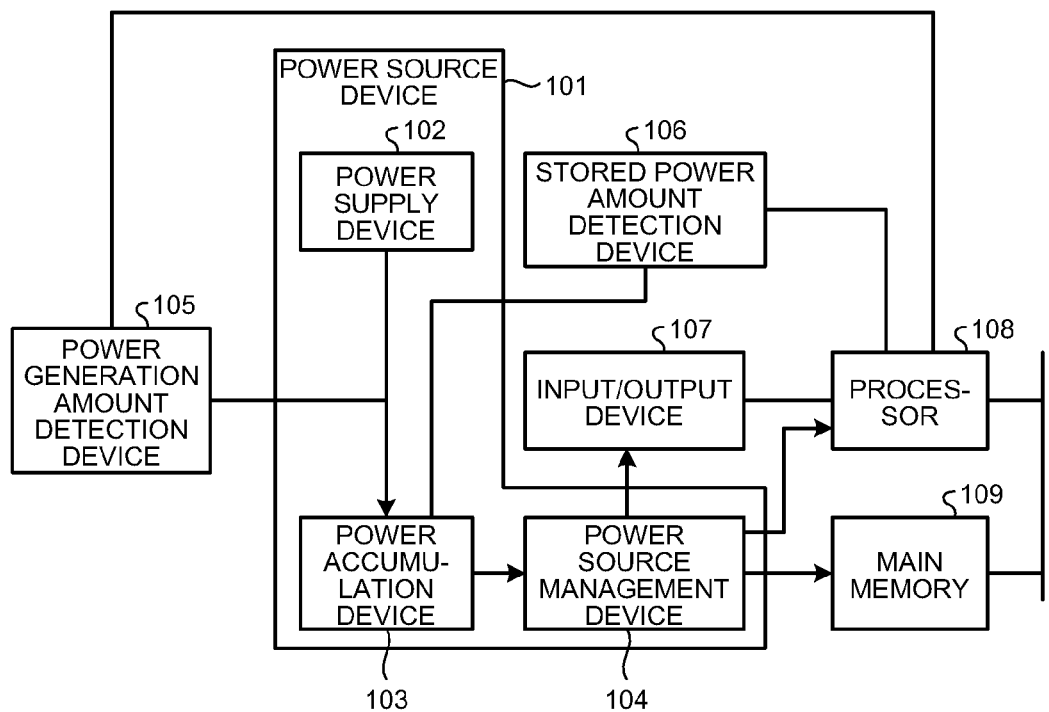
FIG. 2 is a diagram illustrating an example of a hardware configuration of the information processing apparatus of the first embodiment.

FIG. 2 is a diagram illustrating an example of a hardware configuration of the information processing apparatus 100 of the first embodiment. The information processing apparatus 100 of the present embodiment includes a power source device 101, a power generation amount detection device 105, a stored power amount detection device 106, an input/output device 107, a processor 108, and a main memory 109. The power source device 101 includes a power supply device 102, a power accumulation device 103, and a power source management device 104. The power source device 101 corresponds to the power source unit 10 in FIG. 1. The power supply device 102 corresponds to the power generation unit 11 in FIG. 1. The power accumulation device 103 corresponds to the power storage unit 12 in FIG. 1. The power source management device 104 corresponds to the management unit 13 in FIG. 1. The power generation amount detection device 105 corresponds to the power generation amount detection unit 21 in FIG. 1. The stored power amount detection device 106 corresponds to the stored power amount detection unit 22 in FIG. 1. The input/output device 107 corresponds to the input/output unit 60 in FIG. 1. Functions implemented by computer programs being executed on the processor 108 correspond to the control unit 30 (the determination unit 35, the state control unit 40, and the execution control unit 50) in FIG. 1. The main memory 109 corresponds to the process storage unit 51 and the storage unit 70 in FIG. 1.

The power supply device 102 supplies power to the power accumulation device 103. The power supply device 102 is a solar cell, a wireless power feeding device, or an AC power source, for example, but this is not restrictive. The information processing apparatus 100 of the present embodiment will be described assuming that the power supply device 102 is a solar cell. However, the power supply device 102 is not restricted to the solar cell, and an AC power source may be used instead. The solar cell is a device that generates power by using light energy. The power accumulation device 103 accumulates power. The power accumulation device 103 is a large-capacitance capacitor such as an electric double-layer capacitor or a lithium ion capacitor, or a battery such as a lithium ion battery. Alternatively, the power accumulation device 103 may also be a device combining both the large-capacitance capacitor and the battery.

The amount of power generation of the solar cell varies greatly depending on the amount of light or the like, and also, the amount of power consumption of the information processing apparatus 100 is not constant. Accordingly, the information processing apparatus 100 of the present embodiment first charges the power accumulation device 103 with the generated power and then uses the generated power, to absorb the difference between the amount of power generation and the amount of power consumption.

The power source management device 104 supplies power to the devices (including those not illustrated) included in the information processing apparatus 100. For example, the power source management device 104 is a PMIC (Power Management Integrated Circuit) that supplies power to a device included in the information processing apparatus 100.

The power generation amount detection device 105 measures the amount of power generation of the power supply device 102. For example, in the case where the power supply device 102 is a solar cell, the power generation amount detection device 105 measures the amount of power generation by using a shunt resistor. Moreover, in the case where the power supply device 102 is an AC power source, a constant amount of current will be measured at all times by the power generation amount detection device 105. Thus, the information processing apparatus 100 does not have to include the power generation amount detection device 105.

The stored power amount detection device 106 measures the amount of stored power of the power accumulation device 103. For example, in the case where the power accumulation device 103 is a capacitor such as the electric double-layer capacitor or the lithium ion capacitor, the amount of stored power can be obtained by measuring the output voltage. Thus, an AD converter can be used as the power accumulation device 103. Further, in the case where the power accumulation device 103 is a battery such as the lithium ion battery or the like, a coulomb counter can be used as the stored power amount detection device 106. That is, the amount of stored power can be obtained by measuring the amount of charge/discharge of the battery by using the coulomb counter.

The input/output device 107 is a device for receiving information from outside the information processing apparatus 100, and also, a device for outputting information to outside the information processing apparatus 100. To output includes writing to a storage medium, but this is not restrictive. For example, in the case of being a device to be used as an interface to a user, it is a liquid crystal display, a keyboard, a mouse, a touch panel, or the like. Further, in the case of being a device to be used as an auxiliary storage device, the input/output device 107 is a memory card, an optical drive, a hard disk drive, or the like.

The processor 108 executes computer programs of an operating system, an application, or the like. Functions implemented by the computer programs being executed control the operation of the information processing apparatus 100. The processor 108 is subjected to an interrupt process by the input/output device 107. Although not illustrated in FIG. 2, the processor 108 includes an interrupt control device for processing an interrupt. Additionally, this interrupt control device may be provided between the input/output device 107 and the processor 108.

The main memory 109 is a memory that is used at the time of the processor 108 executing a computer program, and stores therein the program itself and data necessary for executing the program. Volatile memory or non-volatile memory may be used. For example, in the case where the main memory 109 is volatile, it is DRAM (Dynamic Random Access Memory), or SRAM (Static Random Access Memory). Further, in the case where the main memory 109 is non-volatile, it is MRAM (Magnetoresistive Random Access Memory), PCM (Phase Change Memory), ReRAM (Resistance Random Access Memory), FeRAM (Ferroelectric Random Access Memory), or the like.

Here, power consumption of the main memory 109 will be described. For example, in the case where the main memory 109 is DRAM, data has to be maintained, but if there is no access to the DRAM, the power consumption can be suppressed by adopting a power saving mode such as a self-refresh mode or the like. In the case where the main memory 109 is MRAM, since the MRAM is non-volatile, the power consumption of the memory can be suppressed by shutting down the power, in addition to the power saving mode such as the self-refresh mode or the like. PCM, ReRAM, and FeRAM are also non-volatile memory, and the power consumption can be suppressed by shutting down the power, as in the case of the MRAM.

Next, an operation state of the information processing apparatus 100 of the present embodiment will be described. The information processing apparatus 100 of the present embodiment adopts an active state (a first state), and an idle state (a second state) with lower power consumption than the active state.

Figure 3:
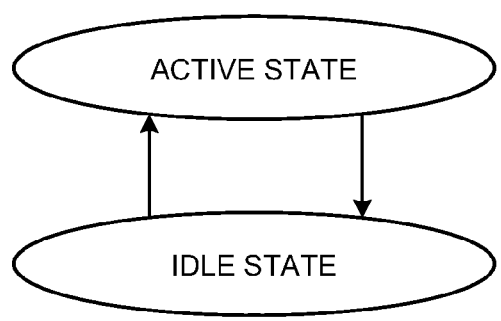
FIG. 3 is a diagram for describing an operation state of the information processing apparatus of the first embodiment.

The idle state of the information processing apparatus 100 is a state where the processor 108, the main memory 109, the power source management device 104 and the like of the information processing apparatus 100 are in the power saving mode. FIG. 3 is a diagram for describing an operation state of the information processing apparatus 100 of the first embodiment.

First, an operation state will be described taking the case of the processor 108 as an example. The active state of the processor is a state where the processor 108 is executing a procedure such as a process. The idle state of the processor is a state of waiting for an interrupt of the input/output device 107. In other words, it is a state where the processor 108 is not executing a procedure such as a process. The power consumption at the time of the idle state of the processor is lower than at the time of the active state of the processor. That is, at this time, the processor is in the state of the power saving mode. Depending on a processor 108, there may be a plurality of states corresponding to the idle state. For example, many processors adopt a first idle state where data is stored with cache memory being on, and a second idle state called a deep sleep mode where the cache memory is turned off and data is not saved. In this manner, there may be a plurality of states with respect to the idle state. The power saving mode of the main memory 109 is according to the description above of the power consumption of the main memory 109. In the power saving mode of the power source management device 104, a voltage to be supplied to each device is supplied being lowered compared to a case of a normal power mode set for each device.

Figure 4:
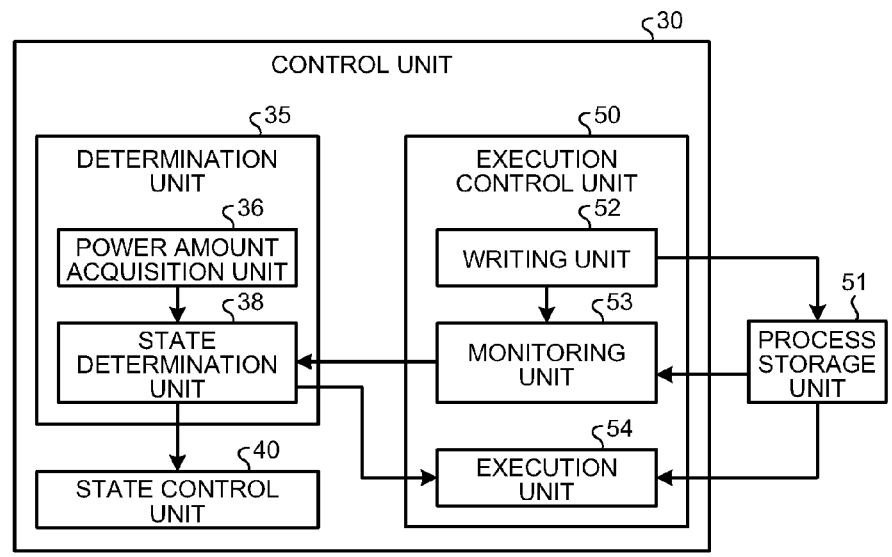
FIG. 4 is a diagram illustrating an example of a configuration of functional blocks of a control unit of the first embodiment.

Next, a configuration of functional blocks of the control unit 30 of the information processing apparatus 100 of the present embodiment will be described. FIG. 4 is a diagram illustrating an example of a configuration of functional blocks of the control unit 30 of the information processing apparatus 100 of the first embodiment, and the process storage unit 51 inside the information processing apparatus 100. The control unit 30 of the present embodiment includes the determination unit 35, the state control unit 40, and the execution control unit 50. The determination unit 35 includes a power amount acquisition unit 36, and a state determination unit 38. The execution control unit 50 includes a writing unit 52, a monitoring unit 53, and an execution unit 54.

The power amount acquisition unit 36 acquires the amount of power generation detected by the power generation amount detection unit 21, or the amount of stored power detected by the stored power amount detection unit 22. When an acquisition request for the amount of power generation is received from the state determination unit 38 described later, the power amount acquisition unit 36 acquires the amount of power generation from the power generation amount detection unit 21, and transmits the amount of power generation to the state determination unit 38. Further, when an acquisition request for the amount of stored power is received from the state determination unit 38 described later, the power amount acquisition unit 36 acquires the amount of stored power from the stored power amount detection unit 22, and transmits the amount of stored power to the state determination unit 38.

The state determination unit 38 receives information about presence/absence of a process from the monitoring unit 53 described later. When the information about presence/absence of a process is received, the state determination unit 38 transmits an acquisition request for the amount of power (the amount of power generation or the amount of stored power) to the power amount acquisition unit 36. The state determination unit 38 receives the amount of power (the amount of power generation or the amount of stored power) transmitted from the power amount acquisition unit 36. The state determination unit 38 determines whether to execute a process or to cause the information processing apparatus 100 to shift to the idle state, based on the information about presence/absence of a process and the amount of power (the amount of power generation or the amount of stored power) which has been received. In the case of determining that a process is to be executed, the state determination unit 38 transmits an instruction to execute a process to the execution unit 54 described later. In the case of determining that the information processing apparatus 100 is to be shifted to the idle state, if there is a process in the process storage unit 51, the state determination unit 38 transmits an instruction that a timer (not illustrated) is to be set and that the information processing apparatus 100 is to be shifted to the idle state, to the state control unit 40 described later. In the case where there is no process in the process storage unit 51, the state determination unit 38 transmits an instruction to cause the information processing apparatus 100 to shift to the idle state, to the state control unit 40 described later.

In the case where the instruction for setting the timer is received from the state determination unit 38, the state control unit 40 sets the timer and shifts the operation state of the information processing apparatus 100 to the idle state, and in the case where there is no process in the process storage unit 51, the state determination unit 38 shifts the operation state of the information processing apparatus 100 to the idle state. In the case of recovery from the idle state by an interrupt which is not a timer interrupt in a state where the timer is set, the state control unit 40 cancels the timer.

The writing unit 52 receives a process from the OS (Operating System). The writing unit 52 writes the received process to the process storage unit 51. For example, the writing unit 52 writes information for identifying a process to be executed to the process storage unit 51. Processes to be executed and the order of execution may be stored in association with each other. After writing the process to the process storage unit 51, the writing unit 52 transmits a notification indicating that writing has been performed, to the monitoring unit 53.

The process storage unit 51 is a storage unit for storing therein a process. For example, the process storage unit 51 stores therein the information for identifying a process to be executed. Processes to be executed and the order of execution may be stored in association with each other. The process storage unit 51 has one or more storage areas.

The monitoring unit 53 receives the notification indicating that the process has been written to the process storage unit 51, from the writing unit 52. The monitoring unit 53 receives, from the timer (not illustrated), a timer interrupt due to expiry of the timer. After receiving the notification indicating that the writing has been performed, the monitoring unit 53 checks whether the process is stored in the process storage unit 51. When a timer interrupt is received, the monitoring unit 53 checks whether the process is stored in the process storage unit 51. The monitoring unit 53 transmits information about whether the process is stored in the process storage unit 51 to the state determination unit 38.

The execution unit 54 receives an instruction to execute a process from the state determination unit 38. When the instruction to execute a process is received, the execution unit 54 reads the process to be executed from the process storage unit 51, and executes the process to be executed.

The process storage unit 51 is configured from two types of areas, i.e. a wait area and an expired area, for example. Generally, the degree of priority and an execution time are added to a process by the operating system. Slots for respective degrees of priority are further prepared in the wait area and the expired area. A process waiting to be executed is written to the wait area. A process which was started but was not completed within a specified execution time is written to the expired area. When the wait area is cleared, the expired area becomes the wait area, and the execution time is newly allocated. Then, the cleared wait area becomes the expired area. That is, the execution control unit 50 controls the order of executing processes while switching the wait area and the expired area. The execution unit 54 extracts, and executes, a process with the higher priority from the process storage unit 51. The configuration of the process storage unit 51 is not restricted to the configuration described above.

Specifically, the control unit 30 of the present embodiment may be implemented as a process scheduler of the operating system operating on the processor 108, for example. The process scheduler is a scheduler granting a CPU execution right to a process such that the CPU (the processor 108) may be used most effectively.

Figure 5:
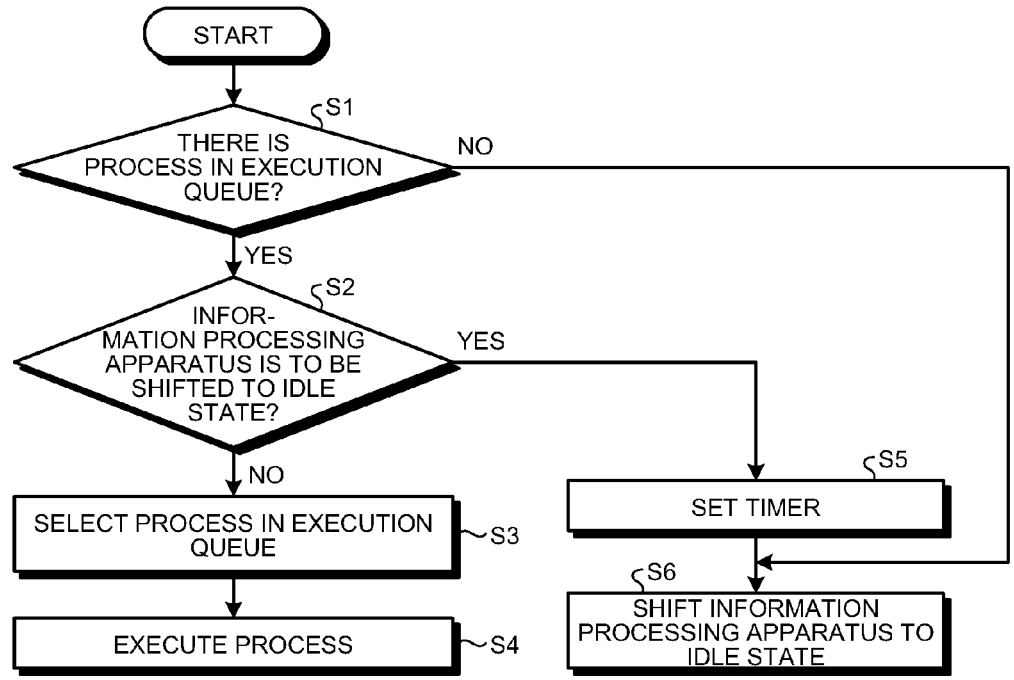
FIG. 5 is a flow chart illustrating an example of an operation state control method of the first embodiment.

FIG. 5 is a flow chart for describing an example of an operation state control method of the information processing apparatus 100 of the first embodiment. When a process is received from the OS, or when a timer interrupt is received from the timer (START), the monitoring unit 53 of the execution control unit 50 determines whether the process is in the process storage unit 51 (step S1). When the process is in the process storage unit 51 (step S1: Yes), the procedure proceeds to step S2. When the process is not in the process storage unit 51 (step S1: No), information indicating that there is no process is transmitted to the state determination unit 38 of the determination unit 35. The state determination unit 38 transmits an instruction to cause the information processing apparatus 100 to shift to the idle state to the state control unit 40. Then, the state control unit 40 shifts the operation state of the information processing apparatus 100 to the idle state (step S6). That is, the state control unit 40 reduces the power consumption of the information processing apparatus 100.

The state determination unit 38 determines whether the operation state of the information processing apparatus 100 is to be shifted to the idle state (step S2). The state determination unit 38 may perform this determination based on an arbitrary condition. A concrete example of the condition will be given later. In the case where the operation state is to be shifted to the idle state (step S2: Yes), the state control unit 40 sets the timer (step S5). After setting the timer, the state control unit 40 shifts the operation state of the information processing apparatus 100 to the idle state (step S6). In the case where the operation state is not to be shifted to the idle state (step S2: No), the execution unit 54 of the execution control unit 50 selects a process in the process storage unit 51 (step S3). The execution unit 54 reads, from the process storage unit 51, and executes the process selected in step S3 (step S4).

The process of the flow chart of FIG. 5 is executed in the following case, for example. The execution control unit 50 executes the process of the flow chart of FIG. 5 at the time of the processor 108 switching a process while waiting for I/O of the input/output device 107, for example. Alternatively, the execution control unit 50 executes the process of the flow chart of FIG. 5 after the execution of a process (step S4) is completed. Still alternatively, the execution control unit 50 executes the process of the flow chart of FIG. 5 when an interrupt occurs in the idle state of the information processing apparatus 100 and the operation state is shifted back to the active state.

Here, the timer setting (step S5) in the flow chart of FIG. 5 will be described. When a timer interrupt occurs due to the expiry of the timer, the execution control unit 50 executes again the process of the flow chart of FIG. 5. When an interrupt that is not a timer interrupt occurs, the state control unit 40 cancels the timer set in step S5, and then, the execution control unit 50 executes again the process of the flow chart of FIG. 5. The timer in step S5 is set such that the process of the flow chart of FIG. 5 occurs in a predetermined time, and thus, it is cancelled when an interrupt occurs and the process of the flow chart of FIG. 5 is executed again.

The operation state of the information processing apparatus 100 of the present embodiment is shifted to the idle state even where there is still a process waiting to be executed. Accordingly, when the operation state is shifted to the idle state in a state where there is still a process waiting to be executed, the information processing apparatus 100 possibly does not execute the process waiting to be executed because there is no I/O process, for example. To prevent this, the execution control unit 50 sets the timer in step S5 such that a timer interrupt occurs in a predetermined time.

Figure 6:
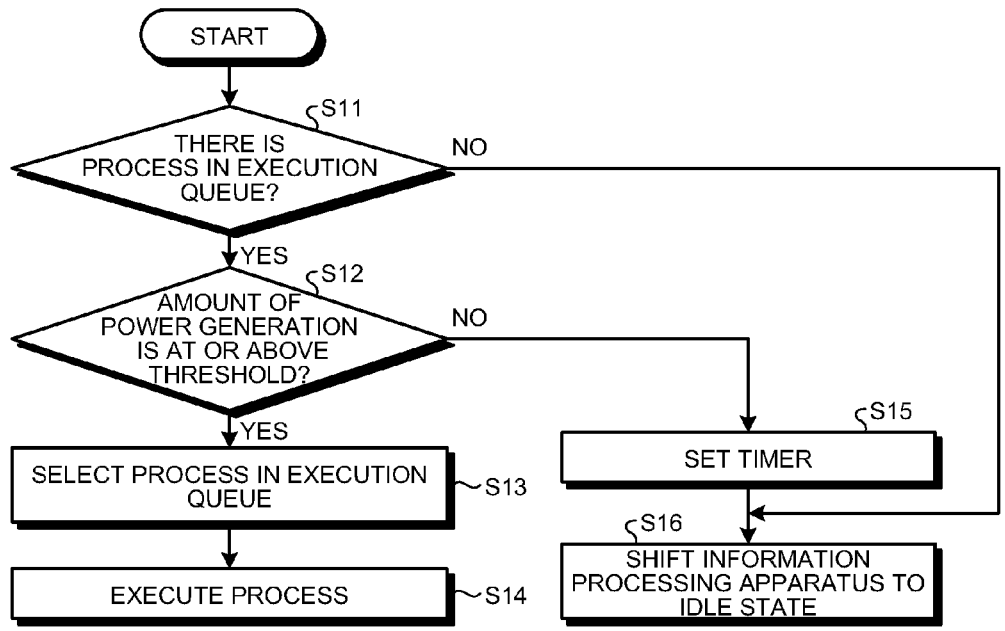
FIG. 6 is a flow chart illustrating an example of a method of determining an amount of power generation of the first embodiment.

FIG. 6 is a flow chart for describing an example of the operation state control method of the information processing apparatus 100 of the first embodiment (a case of determining by the amount of power generation). Other than step S12 is the same as the flow chart of FIG. 5, and redundant description thereof will be omitted. In step S12, the state determination unit 38 of the determination unit 35 determines whether the amount of power generation acquired by the power amount acquisition unit 36 is equal to or larger than a threshold. That is, the state determination unit 38 determines whether the information processing apparatus 100 is to be shifted to the idle state, based on the amount of power generation and the threshold of the amount of the power generation.

Figure 7:
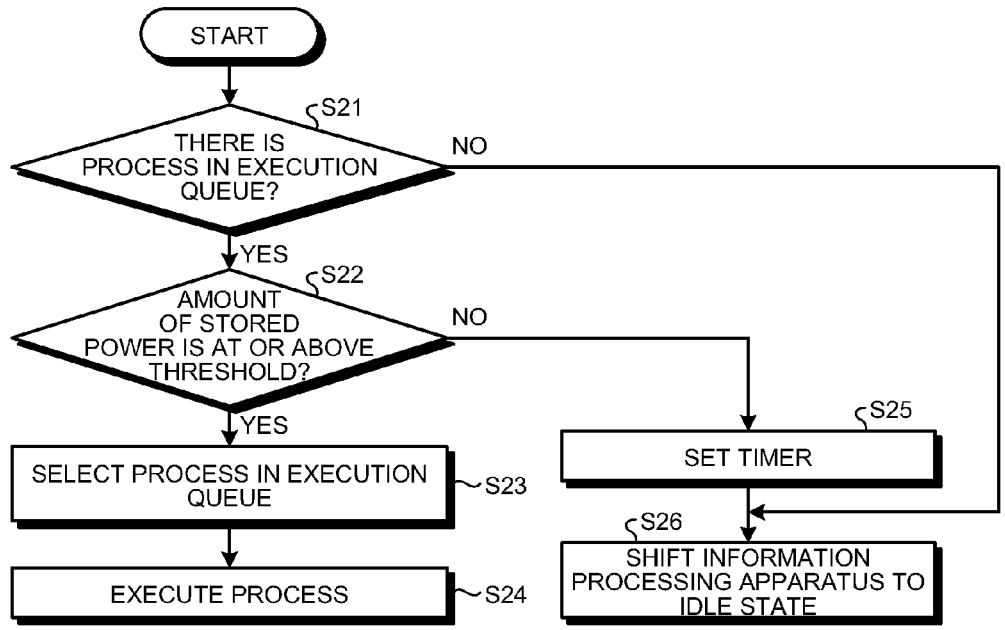
FIG. 7 is a flow chart illustrating an example of a method of determining the amount of stored power of the first embodiment.

FIG. 7 is a flow chart for describing an example of the operation state control method of the information processing apparatus 100 of the first embodiment (a case of determining by the amount of stored power). Other than step S22 is the same as the flow chart of FIG. 5, and redundant description thereof will be omitted. In step S22, the state determination unit 38 of the determination unit 35 determines whether the amount of stored power acquired by the power amount acquisition unit 36 is equal to or larger than a threshold. That is, the state determination unit 38 determines whether the information processing apparatus 100 is to be shifted to the idle state, based on the amount of stored power and the threshold of the amount of the stored power.

Figure 8:
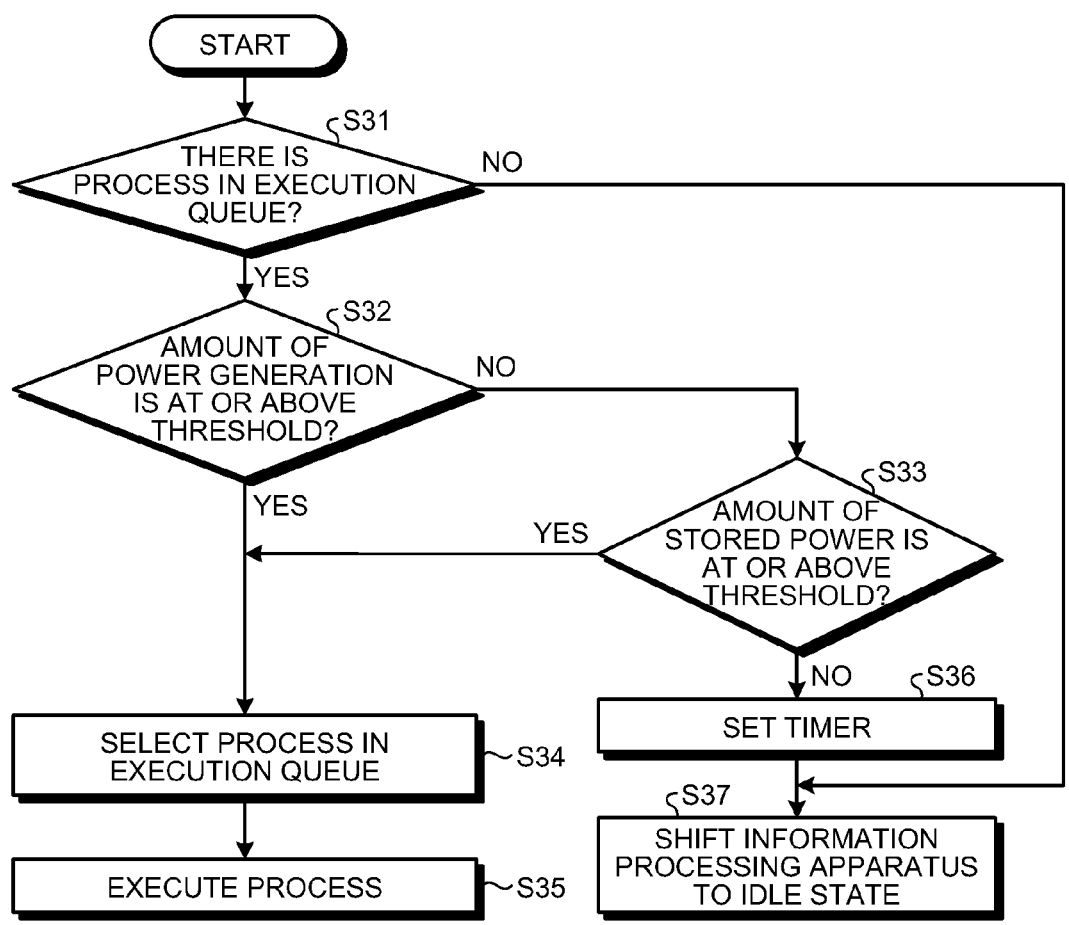
FIG. 8 is a flow chart illustrating an example of a determination method of the amount of power generation and the amount of stored power of the first embodiment.

FIG. 8 is a flow chart for describing an example of the operation state control method of the information processing apparatus 100 of the first embodiment (a case of determining by the amount of power generation and the amount of stored power). Other than steps S32 and S33 is the same as the flow chart of FIG. 5, and redundant description thereof will be omitted. The state determination unit 38 of the determination unit 35 determines whether the amount of power generation acquired by the power amount acquisition unit 36 is equal to or larger than a threshold (step S32). In the case where the amount of power generation is equal to or larger than the threshold (step S32: Yes), the execution unit 54 of the execution control unit 50 selects a process in the process storage unit 51 (step S34). In the case where the amount of power generation is less than the threshold (step S32: No), whether the amount of stored power acquired by the power amount acquisition unit 36 is equal to or larger than a threshold is determined (step S33). In the case where the amount of stored power is equal to or larger than the threshold (step S33: Yes), the state determination unit 38 transmits information about execution of a process to the execution unit 54 of the execution control unit 50. The execution unit 54 of the execution control unit 50 selects a process in the process storage unit 51 (step S34). In the case where the amount of stored power is less than the threshold (step S33: No), the state determination unit 38 transmits, to the state control unit, an instruction that the timer is to be set and that the information processing apparatus 100 is to be shifted to the idle state. The state control unit 40 sets the timer (step S36). The determination method described above is only an example, and a concrete determination method regarding the order of determination of the amount of power generation and the amount of stored power, for example, may be arbitrary.

Even when there is a process waiting to be executed, the information processing apparatus 100 of the present embodiment determines whether the control unit 30 is to shift the operation state to the idle state, based on the amount of power such as the amount of power generation, the amount of stored power and the like. The power consumption per unit time may thereby be suppressed.

Second Embodiment

Next, an information processing apparatus 100 of a second embodiment will be described. The configuration of functional blocks of the information processing apparatus 100 of the second embodiment is the same as that in FIG. 1, and thus, redundant description thereof will be omitted. The functional blocks of a control unit 30 of the present embodiment will be described.

FIG. 9 is a diagram illustrating an example of a configuration of the functional blocks of the control unit 30 of the information processing apparatus 100 and a process storage unit 51 and an operation state storage unit 55 in the information processing apparatus 100, of the second embodiment.

The control unit 30 of the present embodiment includes a determination unit 35, a calculation unit 39, a state control unit 40, and an execution control unit 50. The calculation unit 39 is connected to the operation state storage unit 55. The execution control unit 50 is connected to the process storage unit 51.

The determination unit 35 includes a power amount acquisition unit 36, a threshold setting unit 37, and a state determination unit 38. The execution control unit 50 includes a writing unit 52, a monitoring unit 53, and an execution unit 54.

The power amount acquisition unit 36 acquires the amount of power generation detected by the power generation amount detection unit 21, or the amount of stored power detected by the stored power amount detection unit 22. When an acquisition request for the amount of power generation is received from the state determination unit 38 described later, the power amount acquisition unit 36 acquires the amount of power generation from the power generation amount detection unit 21, and transmits the amount of power generation to the threshold setting unit 37. Further, when an acquisition request for the amount of stored power is received from the state determination unit 38 described later, the power amount acquisition unit 36 acquires the amount of stored power from the stored power amount detection unit 22, and transmits the amount of stored power to the threshold setting unit 37.

The threshold setting unit 37 receives the amount of power (the amount of power generation or the amount of stored power) transmitted from the power amount acquisition unit 36. The threshold setting unit 37 sets a threshold for determining whether the operation state is to be shifted to the idle state, based on the received amount of power (the amount of power generation, the amount of stored power, or the like). Here, setting of a threshold includes a case of setting the threshold to be the same value and a case of changing the threshold. For example, in the case where the amount of power generation or the amount of stored power is great, the threshold setting unit 37 performs calculation such that a threshold of an active rate is increased. In the case where the amount of power generation or the amount of stored power is small, the threshold setting unit 37 performs calculation such that the threshold of the active rate is lowered. The active rate is a rate of the time for which the operation state is the active state (the time for which the operation state is the active state per unit time). By calculating the threshold of the active rate in this manner, if the amount of power generation, the amount of stored power or the like is not sufficient, the active rate of the information processing apparatus 100 can be made low. On the other hand, if there is a sufficient amount of power generation or of stored power, the information processing apparatus 100 can operate in a state with a high active rate.

The state determination unit 38 receives information about presence/absence of a process from the monitoring unit 53 described later. When receiving the information about presence/absence of a process, the state determination unit 38 transmits, to the power amount acquisition unit 36, a request for transmitting the amount of power (the amount of power generation or the amount of stored power) to the threshold setting unit 37. The state determination unit 38 receives an active rate threshold which has been set from the threshold setting unit 37. The state determination unit 38 receives an active rate from the calculation unit 39 described later. The state determination unit 38 compares the active rate threshold and the active rate which have been received. The state determination unit 38 determines whether to execute a process or to shift the information processing apparatus 100 to the idle state, based on the result of comparison. For example, in the case where the active rate is equal to or larger than the active rate threshold, the state determination unit 38 determines that the information processing apparatus 100 is to be shifted to the idle state. In the case where processes are associated with degrees of priority, the state determination unit 38 may further determine whether there is a process with a predetermined or higher degree of priority in the process storage unit 51. In this case, if there is a process with a predetermined or higher degree of priority, the state determination unit 38 may determine that the process is to be executed, and if there is no process with a predetermined or higher degree of priority, the state determination unit 38 may determine that the information processing apparatus 100 is to be shifted to the idle state. In the case where the active rate is less than the active rate threshold, the state determination unit 38 determines that the process is to be executed. Furthermore, the state determination unit 38 may determine whether there is power required for the execution of the process. In this case, if there is enough power for the execution of the process, whether the active rate is equal to or larger than the active rate threshold may be determined, and if there is not enough power for the execution of the process, the information processing apparatus may be determined to be shifted to the idle state. In the case where the process is determined to be executed, the state determination unit 38 transmits an instruction to execute the process to the execution unit 54 described later.

In the case where the information processing apparatus 100 is determined to be shifted to the idle state, and there is a process in the process storage unit 51, the state determination unit 38 transmits an instruction, to the state control unit 40 described later, that the timer (not illustrated) is to be set and that the information processing apparatus 100 is to be shifted to the idle state. In the case where the information processing apparatus 100 is determined to be shifted to the idle state, and there is no process in the process storage unit 51, the state determination unit 38 transmits, to the state control unit 40 described later, an instruction that the information processing apparatus 100 is to be shifted to the idle state.

The writing unit 52 receives a process from the OS (Operating System). The writing unit 52 writes the received process to the process storage unit 51. For example, the writing unit 52 writes information for identifying a process to be executed to the process storage unit 51. Processes to be executed may be written in association with the order of execution. After writing the process to the process storage unit 51, the writing unit 52 transmits a notification indicating that writing has been performed, to the monitoring unit 53.

The process storage unit 51 is a storage unit for storing therein a process. For example, the process storage unit 51 stores therein information for identifying a process to be executed. Processes to be executed and the order of execution may be stored in association with each other. The process storage unit 51 has one or more storage areas.

The monitoring unit 53 receives the notification indicating that the process has been written to the process storage unit 51, from the writing unit 52. The monitoring unit 53 receives, from the timer (not illustrated), a timer interrupt due to expiry of the timer. After receiving the notification indicating that the writing has been performed, the monitoring unit 53 checks whether the process is stored in the process storage unit 51. When a timer interrupt is received, the monitoring unit 53 checks whether the process is stored in the process storage unit 51. The monitoring unit 53 transmits information about whether the process is stored in the process storage unit 51 to the state determination unit 38.

The execution unit 54 receives an instruction to execute a process from the state determination unit 38. When the instruction to execute a process is received, the execution unit 54 reads the process to be executed from the process storage unit 51, and executes the process to be executed.

The operation state storage unit 55 associates information about whether the operation state of the information processing apparatus 100 is the active state with time information, and stores therein the information.

The calculation unit 39 calculates the active rate indicating the proportion of the time for which the operation state is the active state (the time for which the operation state is the active state per unit time), based on the information, associated with the time information, about whether the operation state of the information processing apparatus 100 is active, stored in the operation state storage unit 55.

The calculation unit 39 transmits the calculated active rate to the state determination unit 38.

In the case where the operation state of the information processing apparatus 100 is determined to be shifted to the idle state, if there is a process in the process storage unit 51, the state control unit 40 sets the timer and shifts the operation state of the information processing apparatus 100 to the idle state, and if there is no process in the process storage unit 51, the state control unit 40 shifts the operation state of the information processing apparatus 100 to the idle state. In the case of recovery from the idle state by an interrupt which is not a timer interrupt in a state where the timer is set, the state control unit 40 cancels the timer.

Description of the execution control unit 50 is the same as for the case of the information processing apparatus 100 of the first embodiment, and redundant description thereof is omitted.

FIG. 10 is a diagram illustrating a method of deciding a threshold of the active rate of the information processing apparatus 100 of the second embodiment. In the example of FIG. 10, the threshold of the active rate is changed according to the amount of stored power. Alternatively, the threshold setting unit 37 may change the threshold of the active rate according to other types of power information such as the amount of power generation. Still alternatively, the threshold setting unit 37 may change the threshold of the active rate according to a plurality of pieces of power information (the amount of power generation, the amount of stored power, and the like). In the example of FIG. 10, the threshold of the active rate is lower as the amount of stored power is smaller.

Figure 11:
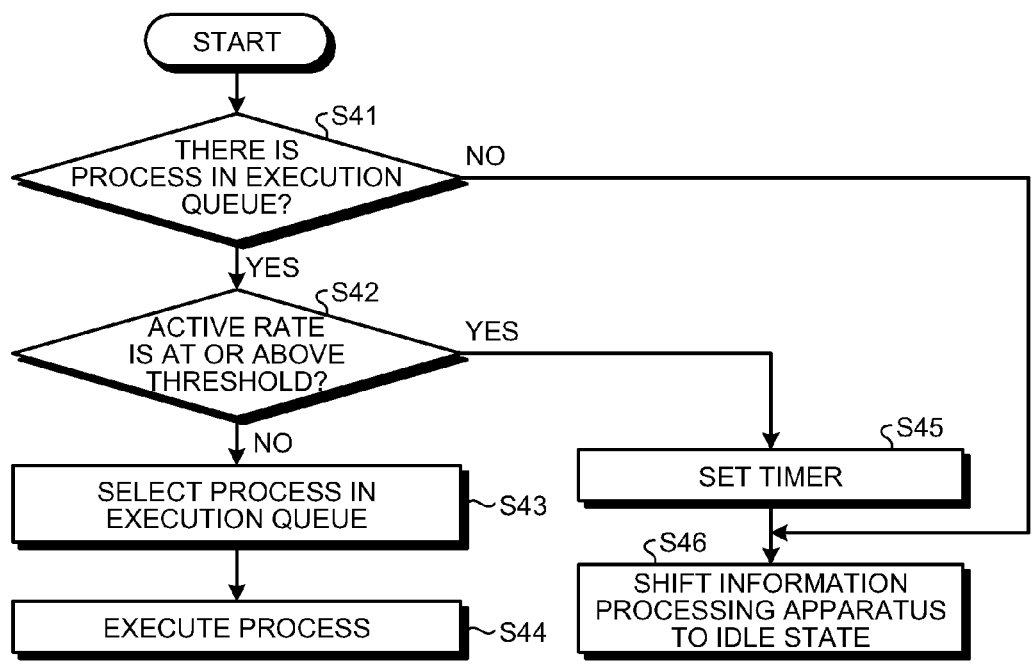
FIG. 11 is a flow chart illustrating an example of a determination method based on the active rate of the second embodiment.

FIG. 11 is a flow chart for describing an example of the operation state control method of the information processing apparatus 100 of the second embodiment (a case of determining by the active rate). Other than step S42 is the same as the flow chart of FIG. 5, and redundant description thereof will be omitted. In step S42, the state determination unit 38 of the determination unit 35 determines whether an active rate is equal to or larger than a threshold. That is, the state determination unit 38 determines whether the information processing apparatus 100 is to be shifted to the idle state, based on the active rate and the threshold of the active rate.

Figure 12:
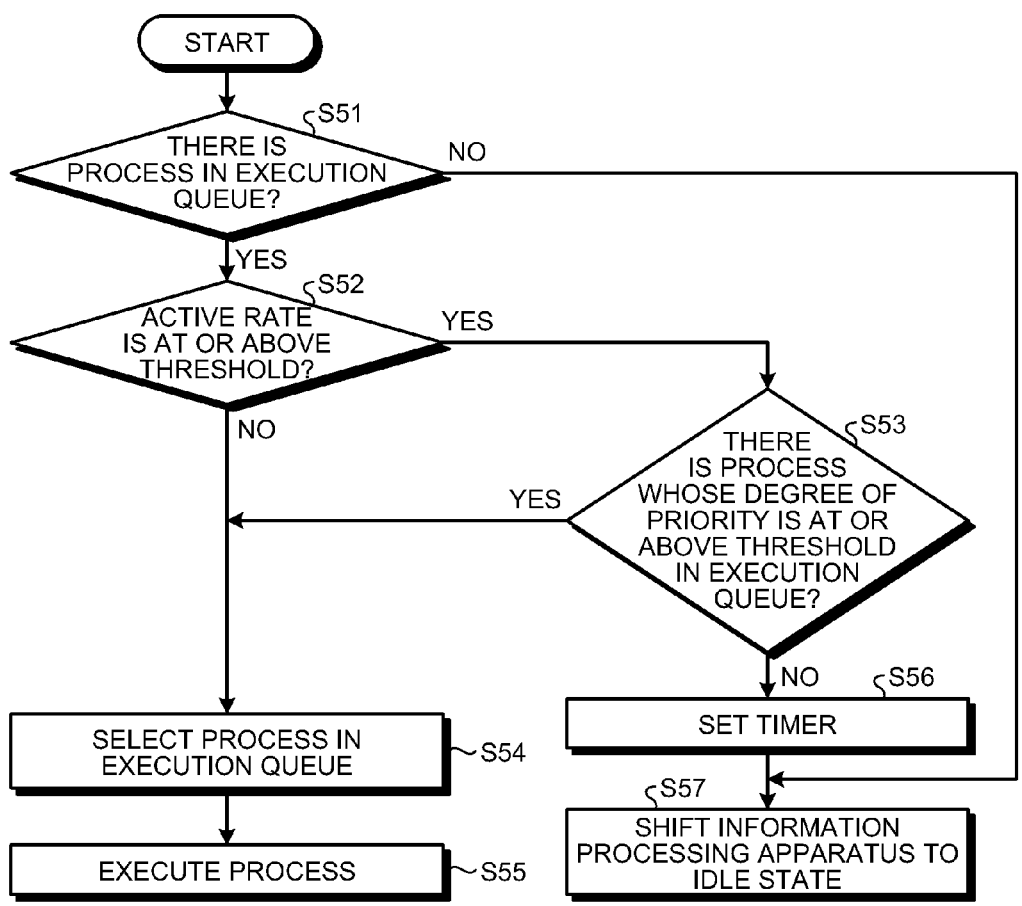
FIG. 12 is a flow chart illustrating an example of a determination method based on the degree of priority of a process of the second embodiment.

FIG. 12 is a flow chart for describing an example of the operation state control method of the information processing apparatus 100 of the second embodiment (a case of determining by the active rate and the degree of priority regarding a process). Other than steps S52 and S53 is the same as the flow chart of FIG. 5, and redundant description thereof will be omitted. The state determination unit 38 of the determination unit 35 determines whether an active rate is equal to or larger than a threshold (step S52). In the case where the active rate is less than the threshold (step S52: No), the execution unit of the execution control unit 50 selects a process in the process storage unit 51 (step S54). In the case where the active rate is equal to or larger than the threshold (step S52: Yes), the state determination unit 38 determines whether there is a process in the process storage unit 51 whose degree of priority is equal to or larger than a threshold (step S53). In the case where the degree of priority is equal to or larger than the threshold (step S53: Yes), the execution unit 54 of the execution control unit 50 selects the process in the process storage unit 51 (step S54). In the case where the degree of priority is less than the threshold (step S53: No), the state determination unit 38 transmits, to the state control unit, an instruction that the timer is to be set and that the information processing apparatus 100 is to be shifted to the idle state. The state control unit 40 sets the timer (step S56). The determination method described above is only an example, and a concrete determination method regarding the order of determination of the active rate and the degree of priority, for example, may be arbitrary.

In the example of the process of the flow chart of FIG. 12, the degree of priority of a process is included in the conditions for determining whether the state is to be shifted to the idle state. Accordingly, even if the amount of power generation and the amount of stored power are small and the power is not sufficient, a process with a high degree of priority may be executed in the active state. On the other hand, in the case of a process with a low degree of priority, the process is not executed and the information processing apparatus 100 is shifted to the idle state to thereby save the power. The operation time of the information processing apparatus 100 can thereby be extended, and time can be created to feed power.

Figure 13:
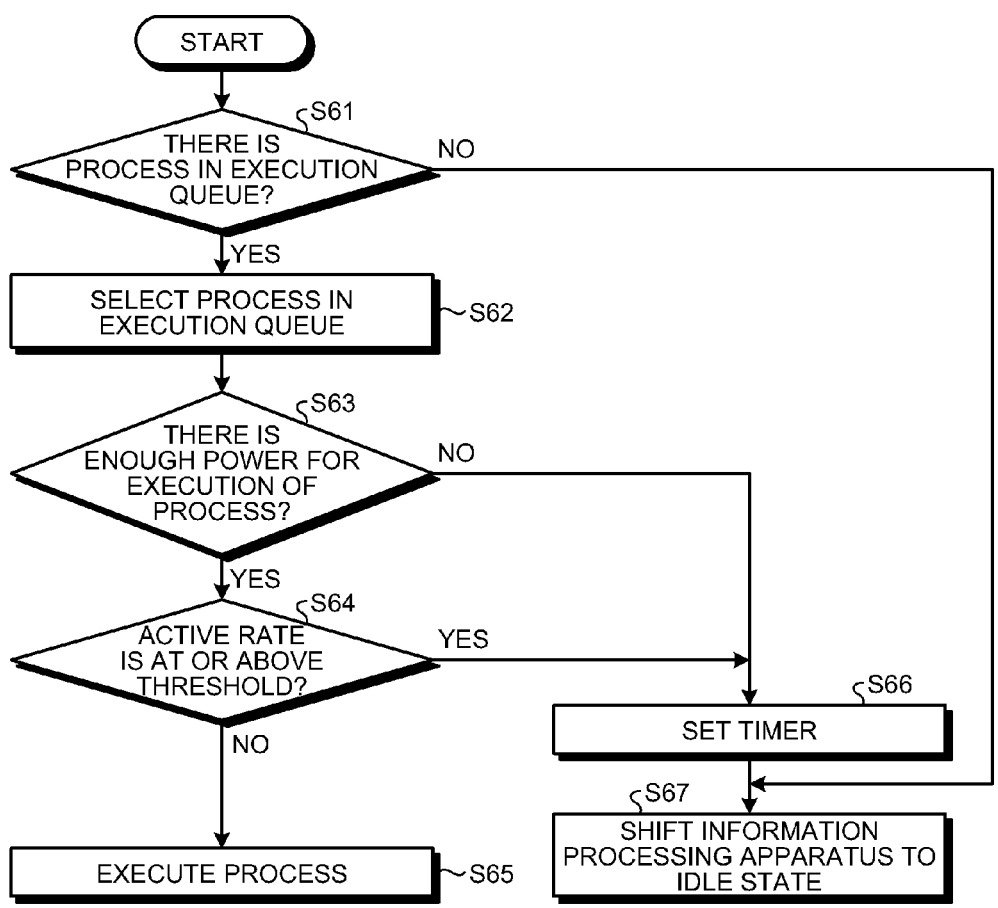
FIG. 13 is a flow chart illustrating an example of a determination method based on power consumption of a process of the second embodiment.

FIG. 13 is a flow chart for describing an example of the operation state control method of the information processing apparatus 100 of the second embodiment (a case of determining by the active rate and the power consumption of a process). First, the power consumption of a process will be described. For example, the power consumption of a process may be managed, by the operating system, the application or the like, by measuring the power consumption during execution of the process or by counting the number of times of I/O of the input/output device 107, and adding the same, as power amount information, to the information about the process. The reason the number of times of I/O is managed as the power amount information is that power consumption can be predicted based on the number of times of I/O. The power amount information (the power consumption, the number of times of I/O, or the like) of a process may be stored in the storage unit 70 for each process, and the control unit 30 may read the power consumption at the time of execution of a process from the storage unit 70. Further, the amount of power consumption or the number of times of I/O predicted in advance may be prepared in advance by a user as information about an executable file to be a process. When a process is created, its power amount information is added to the information about the process together with the information about the degree of priority and the execution time of the operating system. The power amount information of a process may be managed by the control unit 30, or may be managed by another application or the like using the storage unit 70 and be read by the control unit 30 from the storage unit 70.

The monitoring unit 53 of the execution control unit 50 determines whether there is a process in the process storage unit 51 (step S61). In the case where there is a process in the process storage unit 51 (step S61: Yes), the execution unit 54 of the execution control unit 50 selects a process in the process storage unit 51 (step S62). In the case where there is no process in the process storage unit 51 (step S61: No), the state determination unit 38 transmits, to the state control unit, an instruction that the information processing apparatus 100 is to be shifted to the idle state. The state control unit 40 shifts the operation state of the information processing apparatus 100 to the idle state (step S67). That is, the state control unit 40 reduces the power consumption of the information processing apparatus 100.

The state determination unit 38 of the determination unit 35 determines whether there is enough power for the execution of the process (step S63). In the case where there is enough power for the execution of the process (step S63: Yes), the procedure proceeds to step S64. In the case where there is not enough power for the execution of the process (step S63: No), the state determination unit 38 transmits, to the state control unit, an instruction that the timer is to be set and that the information processing apparatus 100 is to be shifted to the idle state. The state control unit 40 sets the timer (step S66). After setting the timer, the state control unit 40 shifts the operation state of the information processing apparatus 100 to the idle state (step S67).

The state determination unit 38 of the determination unit 35 determines whether the active rate is equal to or larger than the threshold (step S64). In the case where the active rate is less than the threshold (step S64: No), the execution unit 54 executes the process selected in step S62 (step S65).

In the case where the active rate is equal to or larger than the threshold (step S64: Yes), the state determination unit 38 transmits, to the state control unit, an instruction that the timer is to be set and that the information processing apparatus 100 is to be shifted to the idle state. The state control unit 40 sets the timer (step S66). After setting the timer, the state control unit 40 shifts the operation state of the information processing apparatus 100 to the idle state (step S67).

In the example of the process of the flow chart of FIG. 13, the power consumption required for a process is included in the conditions for determining whether the state is to be shifted to the idle state. Accordingly, if there is no power for executing a process, the information processing apparatus 100 can be immediately shifted to the idle state, and the power consumption of the information processing apparatus 100 can be suppressed.

In the description above, concrete examples have been described where the conditions for determining whether the operation state of the information processing apparatus 100 is to be shifted to the idle state are only the active rate (FIG. 11), the active rate and the degree of priority of a process (FIG. 12), and the active rate and the power required for a process (FIG. 13). However, the conditions for determining whether the operation state of the information processing apparatus 100 is to be shifted to the idle state are not restricted to the above. For example, the condition for determining whether the operation state of the information processing apparatus 100 is to be shifted to the idle state may include a plurality of conditions combining the active rate, the degree of priority of a process and the power required for a process. Further, a single condition, for example, only the degree of priority for a process, is also allowed.

According to the information processing apparatus 100 of the present embodiment, the control unit 30 determines whether the operation state is to be shifted to the idle state, based on the active rate, the degree of priority of a process, the power consumption of a process, or the like, even in the case where there is a process waiting to be executed. The power consumption per unit time can thereby be suppressed.

As described above, according to the information processing apparatuses 100 of the first and second embodiments, the power consumption per unit time can be suppressed even where there is a process waiting to be executed.

The information processing apparatuses 100 of the first and second embodiments are advantageous in the case where there are many processes that are yet to be executed, and there is not enough amount of power in the power accumulation device 103 for executing all the processes, for example.

For example, as a concrete example for such a case, there may be cited a boot sequence for an operating system. At the time of the boot of the operating system, first, kernel environment setting, memory management, process management, file management and the like are performed. Next, a process is created, and a process scheduler starts operating. Then, initialization of a processor, initialization of a device driver and the like, mounting of a root file system, and the like are performed by processes for these pieces of processing. However, since the power load of each process is great, in the case of a device that is driven by a solar cell, the amount of power consumption may greatly exceed the amount of power generation and the device possibly stops during boot. Accordingly, by applying the present invention to such a device, whether a process is to be executed or the device is to be shifted to the idle state with low power consumption without the process being executed can be determined according to the amount of power generation or the amount of stored power. The power consumption per unit time can thereby be controlled, and thus, the amount of stored power will not run out, and the device may be safely booted.

Figure 14:
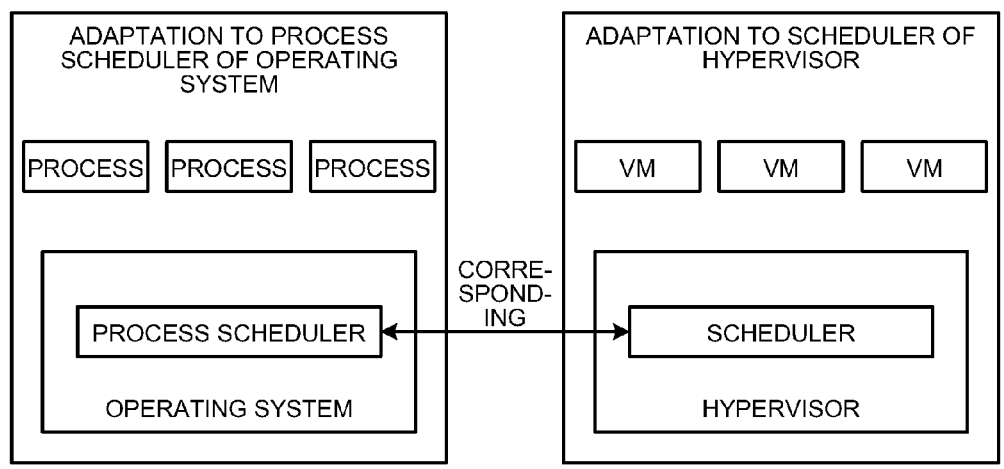
FIG. 14 is a diagram illustrating a concrete example of a case of application of the control units of the first and second embodiments.

FIG. 14 is a diagram for describing a concrete example of a case of application of the control units 30 of the information processing apparatuses 100 of the first and second embodiments. The control units 30 of the information processing apparatuses 100 of the first and second embodiments may be applied to a process scheduler of an operating system. The operation of a process scheduler in the operating system and the operation of a scheduler in a hypervisor of virtual technology are similar to each other. Accordingly, the control units 30 of the information processing apparatuses 100 of the first and second embodiments may also be applied to the scheduler of the hypervisor of the virtual technology. That is, execution of a VM (Virtual Machine) can be controlled by the control units 30 by performing similar control with execution of the processes of the first and second embodiments described above. Concrete examples of the control units 30 of the information processing apparatuses 100 of the first and second embodiments are not restricted to the process scheduler and the scheduler of the hypervisor.

Modification Examples of First and Second Embodiments

Figure 15:
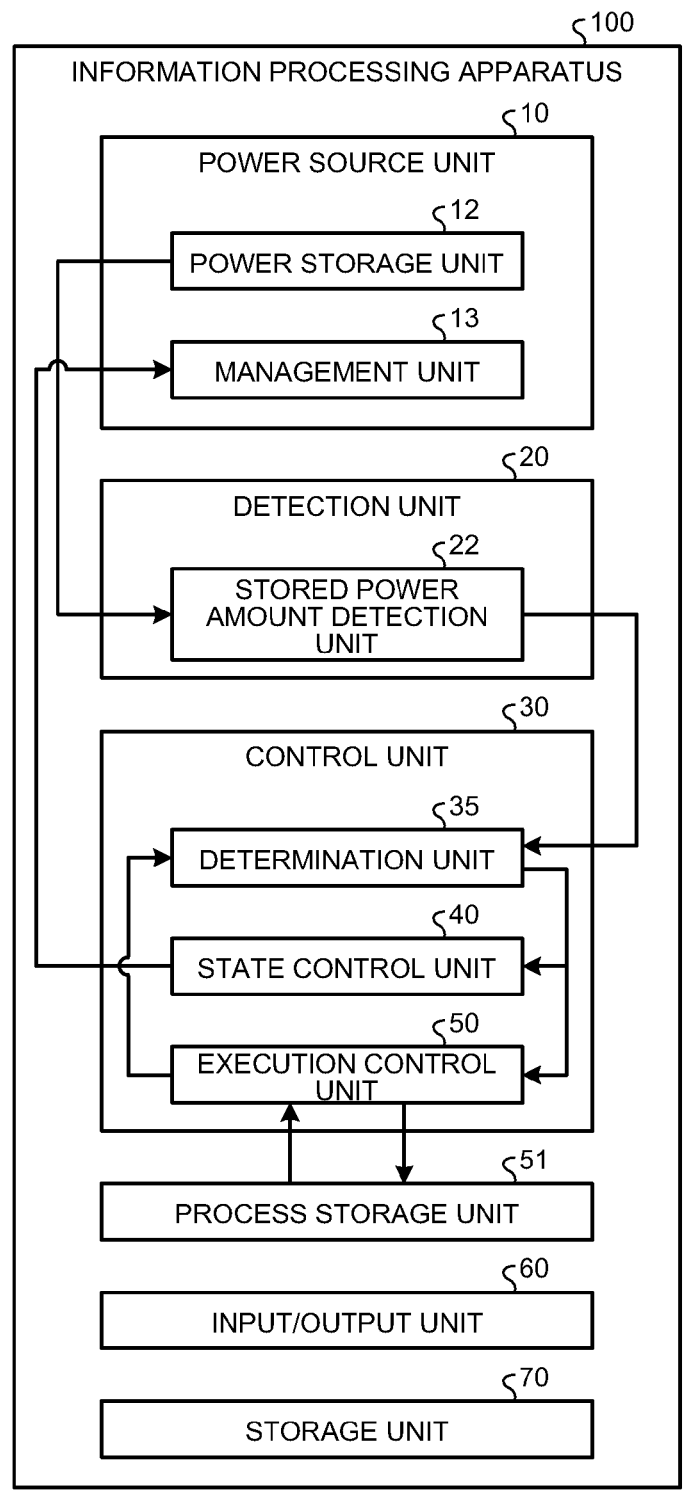
FIG. 15 is a diagram illustrating an example of a configuration of functional blocks of a modification example of the first and second embodiments.

In the embodiments described above, examples where the power generation unit 11 and the power generation amount detection unit 21 are present have been described, but the power generation unit 11 and the power generation amount detection unit 21 do not have to be included. FIG. 15 is a diagram illustrating an example of a configuration of functional blocks of an information processing apparatus 100 which is a modification example of the first and second embodiments.

Figure 16:
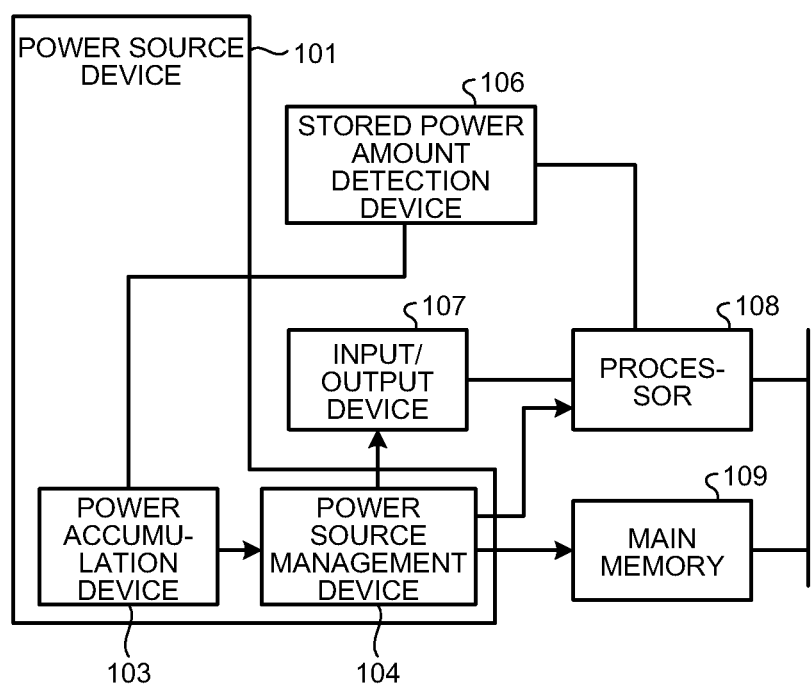
FIG. 16 is a diagram illustrating an example of a hardware configuration of the modification example of the first and second embodiments.

According to the information processing apparatus 100 of the present modification example, the power amount acquisition unit 36 (see FIG. 4 or 9) acquires only the amount of stored power from the stored power amount detection unit 22. FIG. 16 is a diagram illustrating an example of a hardware configuration of a modification example of the first and second embodiments. According to the information processing apparatus 100 of the present modification example, the power accumulation device 103 stores power by being supplied with power in advance by a power supply unit not illustrated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus capable of switching, its operation state between a first state and a second state with lower power consumption than the first state, the apparatus comprising:
   a processor configured to:
   control execution of a process;
   determine, in a case where there is a process waiting to be executed, whether the apparatus is to be placed in the second state; and place the apparatus in the second state in a case where an active rate is equal to or larger than a first threshold, the active rate indicating a time for which the apparatus is in the first state per unit time.

2. The apparatus according to claim 1, further comprising:
a power storage device configured to store therein power; and a stored power amount detector configured to detect an amount of stored power of the power storage device, wherein
the processor places the apparatus in the second state in a case where the amount of stored power is equal to or less than a second threshold.

3. The apparatus according to claim 1, further comprising:
a power generator configured to generate power; and
a power generation amount detector configured to detect an amount of generated power of the power generator, wherein
the processor places the apparatus in the second state in a case where the amount of generated power is equal to or less than a second threshold.

4. The apparatus according to claim 1, further comprising:
a power generator configured to generate power;
a power storage device configured to store therein power;
a power generation amount detector configured to detect an amount of generated power of the power generator; and
a stored power amount detector configured to detect an amount of stored power of the power storage device, wherein
the processor places the apparatus in the second state in a case where the amount of generated power is equal to or less than a third threshold and the amount of stored power is equal to or less than a second threshold.

5. The apparatus according to claim 1, further comprising:
a calculator configured to calculate the active rate.

6. The apparatus according to claim 1, further comprising:
a power generator configured to generate power; and
a power generation amount detector configured to detect an amount of generated power of the power generator, wherein
the processor changes the second threshold according to the amount of generated power.

7. The apparatus according to claim 1, further comprising:
a power storage device configured to store therein power; and
a stored power amount detector configured detect an amount of stored power of the power storage device, wherein
the processor changes the second threshold according to the amount of stored power.

8. The apparatus according to claim 1, further comprising:
a power generator configured to generate power;
a power storage device configured to store therein power;
a power generation amount detector configured to detect an amount of generated power of the power generator; and
a stored power amount detector configured to detect an amount of stored power of the power storage device, wherein
the processor changes the second threshold according to the amount of generated power and the amount of stored power.

9. The apparatus according to claim 1, wherein the processor does not place the apparatus in the second state in a case where there is the process waiting to be executed whose degree of priority is equal to or larger than a second threshold.

10. The apparatus according to claim 1, further comprising:
a storage device configured to store therein power consumption at a time of execution of the process, wherein
the processor reads the power consumption at the time of execution of the process, and places the apparatus in the second state in a case where there is not enough power for execution of the process.

11. The apparatus according to claim 1, wherein
the process is a virtual machine, and the processor is a hypervisor that controls execution of the virtual machine.

12. An operation state control method performed in an information processing apparatus capable of switching its operation state between a first state and a second state with lower power consumption than the first state, the method comprising:
controlling, by a processor, execution of a process;
determining, by the processor, in a case where there is a process waiting to be executed, whether the apparatus is to be placed in the second state; and
placing, by the processor, the apparatus in the second state in a case where an active rate is equal to or larger than a first threshold, the active rate indicating a time for which the apparatus is in the first state per unit time.

13. A computer program product comprising a non-transitory computer-readable medium containing a computer program that causes a computer capable of switching its operation state between a first state and a second state with lower power consumption than the first state to perform:
controlling execution of a process;
determining, in a case where there is a process waiting to be executed, whether the apparatus is to be placed in the second state; and
placing the apparatus in the second state in a case where an active rate is equal to or larger than a first threshold, the active rate indicating a time for which the apparatus is in the first state per unit time.

* * * * *